(12) United States Patent
Farrell

(10) Patent No.: US 10,671,633 B2
(45) Date of Patent: Jun. 2, 2020

(54) SYSTEM AND METHOD FOR 3D GEOLOCATION TO A BUILDING FLOOR LEVEL IN AN URBAN ENVIRONMENT

(71) Applicant: Data Vision Group, LLC, Middle Village, NY (US)

(72) Inventor: Edward Richard Farrell, Hamilton Square, NJ (US)

( * ) Notice: Subject to any disclaimer, the term of this patent is extended or adjusted under 35 U.S.C. 154(b) by 307 days.

(21) Appl. No.: 15/956,388

(22) Filed: Apr. 18, 2018

(65) Prior Publication Data

US 2019/0325054 A1 Oct. 24, 2019

(51) Int. Cl.
*G06F 3/0481* (2013.01)
*G06F 16/26* (2019.01)
*G06F 16/29* (2019.01)
*G06F 16/25* (2019.01)
*G06F 16/22* (2019.01)

(52) U.S. Cl.
CPC .......... *G06F 16/26* (2019.01); *G06F 3/04815* (2013.01); *G06F 16/2264* (2019.01); *G06F 16/252* (2019.01); *G06F 16/29* (2019.01)

(58) Field of Classification Search
None
See application file for complete search history.

(56) References Cited

U.S. PATENT DOCUMENTS

2012/0162225 A1* 6/2012 Yang ................ G06F 16/29
345/420
2013/0086108 A1* 4/2013 Ramaswamy ........ H04M 1/663
707/770
2017/0242873 A1* 8/2017 Barrow ................ G06F 16/29

* cited by examiner

*Primary Examiner* — Richard M Camby

(57) ABSTRACT

A computer system and method for performing 3D geolocation within an urban environment to at least a building floor level by combining geocoded locations with local dimensional data available from municipal agencies processed to calculate estimated elevation of building floors in a target building. The local dimensional data is building inventory information that includes the ground elevation of the target building, the number of above-ground floors in the target building and the height of the target building. The system is configured to calculate the building floor level of a particular floor in the target building from the local data. Standard equations for estimating the height of a building are adapted to generate the elevation of the particular floor within the target building relative to the ground elevation of the target building.

10 Claims, 2 Drawing Sheets

SYSTEM AND METHOD FOR 3D GEOLOCATION TO A BUILDING FLOOR LEVEL IN AN URBAN ENVIRONMENT

FIELD OF THE INVENTION

The present invention related to 3D geolocation systems and methods in urban environments.

BACKGROUND OF THE INVENTION

Geolocation as used in this application refers to the process or technique of identifying the geographical location of a person or thing by means of digital information processed via computer or Internet based applications. Geolocation also refers to the identified geographical location. The applications for identifying geolocations ("geolocation applications") are generally configured to display the resulting geolocation via a user interface to a map or other visual representation on a display screen. Various geolocation applications exist for locating on a map an address or a latitude/longitude point (a "point geolocation") at ground or street level.

Geolocation of an address within an urban environment can be challenging when, for example, the address is located inside a building on a floor that is above or below ground/street level. A geographic location positioned above or below ground/street level is referred to as a three-dimensional geolocation (or "3D geolocation"). Accurate 3D geolocation is important, particularly in emergency situations when response time can be greatly reduced by locating an address within a building as quickly as possible. Accurate 3D geolocation is also important economically as, for example, it can reduce delivery time for goods and services.

U.S. Pat. No. 9,188,444 (the '444 patent) discloses a computer system and method for correcting the placement of an object on a map or an image representing a 3D geolocated scene. The system disclosed in the '444 patent in part uses a distance between a camera that captured the 3D scene and one or more structures in the scene to calculate the depth data for structures in the image. Because the system relies on depth data of structures in the geolocated scene (i.e., structures above ground level), it appears that the system would be challenged to calculate, for example, geolocations for areas not represented on the image, such as floors in a building that are located below ground level. Furthermore, the accuracy of depth data estimated from images may be subject to the quality and interpretation of the images.

Accordingly, there is a need for a computer system and method for more accurately and more consistently determining a geolocation within an urban environment to at least a building floor level above or below ground/street level.

BRIEF SUMMARY

A computer system and method is disclosed herein for performing 3D geolocation within an urban environment to at least a building floor level by combining geocoded locations with local data available from municipal agencies processed to calculate estimated elevation of building floors in a target building. The local data is building inventory information that includes the ground elevation of the target building, the number of above-ground floors in the target building and the height of the target building. The system is configured to calculate the building floor level of a particular floor in the target building from the local data. Standard equations for estimating the height of a building are adapted to generate the elevation of the particular floor within the target building relative to the ground elevation of the target building.

DETAILED DESCRIPTION OF THE INVENTION

Figure 1:
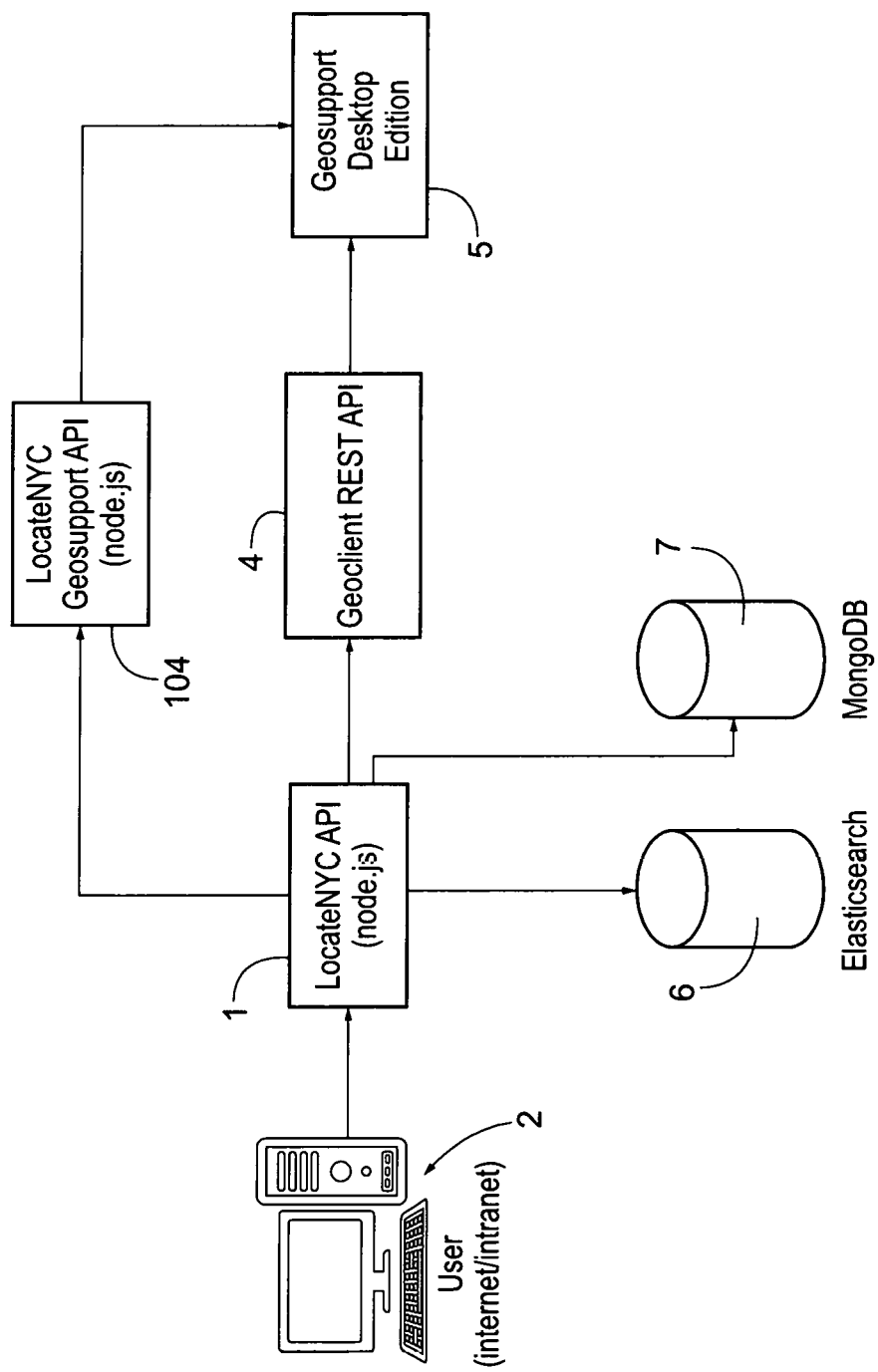
FIG. 1 illustrates the components of the invention.
Figure 2:
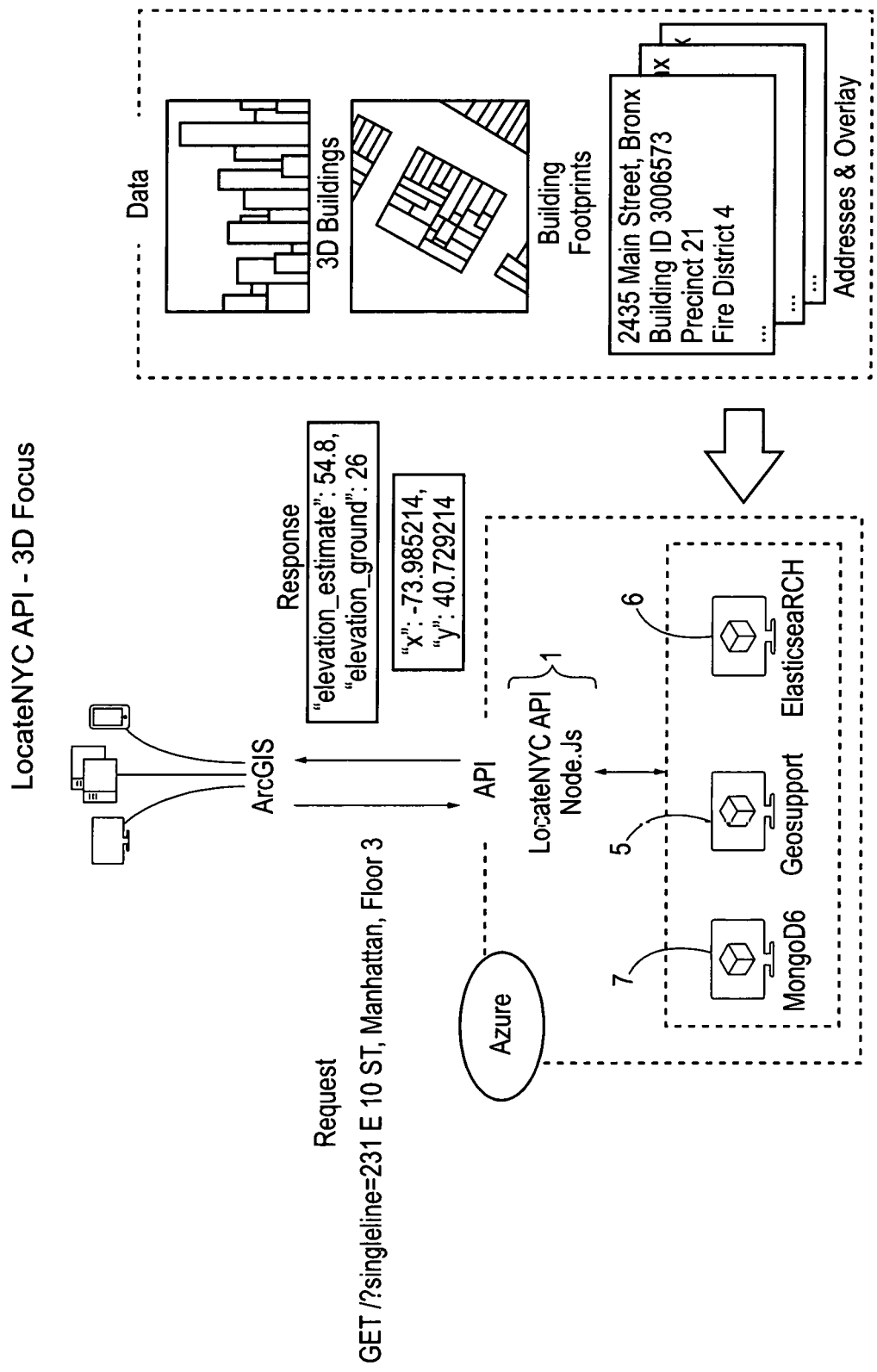
FIG. 2 illustrates an example of the first geocoding application as it interacts with the first and second data sources.

The invention is a computer system for performing geolocation within an urban environment to at least a building floor level by combining geocoded locations with dimensional and location data available from municipal agencies processed to calculate estimated elevation of building floors, either above ground level or below ground level. The urban environment may be any city that has available municipal agency dimensional and location data for structures in the urban environment, such as, for example, New York, N.Y., U.S.A. ("NYC"). Municipal agencies in an urban environment often collect, compile and warehouse information such as building inventory data including building locations, building dimensions and heights, the number of floors in the building, etc. Examples of municipal agencies that may collect such dimensional and location information are tax departments, facilities departments, housing departments, police and fire departments, etc. Further examples of information useful for geocoding purposes include place name identification, building identification number information ("BIN"), tax lot identification information, a borough, block and tax lot identification information ("BBL") and street intersection information.

The system of the invention comprises a first geocoding application 1 ("LocateNYC API" in the example below) associated with a first computer processor in communication with a first data source 6 and a second data source 7. The first geocoding application 1 is configured to request and receive a geographic location of a target building in the urban environment from the first data source 6. The geographic location is a ground or street level location in the urban environment for the target building. The first geocoding application further requests and receives dimensional building data in the form of a building dataset for the target building from the second data source 7. The building dataset includes dimensional information for structures in the environment such as the ground elevation of the target building, the number of floors in the target building and the height of the target building. The first geocoding application 1 is configured to calculate from the building dataset the building floor level of a particular floor in the target building. To calculate the building floor level, the first geocoding application uses standard equations for estimating building height that have been adapted to generate the elevation of the particular floor within the target building relative to the ground elevation of the target building. The geographic location and the building floor level are combined to calculate a building floor level geolocation in the target building. A user interface 2 is provided that is associated with a second computer processor in communication with the first computer processor of the first geocoding application 1. The user interface 2 is configured to receive and display the building floor level geolocation in the target building on a map or 3D graphic representation of the urban environment.

The first geocoding application 1 is a web-based application for performing 3d geocoding within an urban environment, such as, for example, New York, N.Y., USA. The application combines geocoded locations (ground or street level locations) with local data available from municipal agencies processed to calculate estimated elevation of building floors within a target building. The application is preferably based on a REST API (representational state transfer application programming interface) architecture.

The first data source may be in the form of a second geocoding application 4 available from a third party, the application in communication with a geolocation database 66. For example, in the NYC urban environment, the second geocoding application 4 may be the Geosupport Desktop Edition available from the New York City Department of City Planning. See: http://www1.nyc.gov/site/planning/data-maps/open-data/dwn-gde-home.page Alternatively, the first data source may be a custom second geocoding application 104 ("LocateNYC Geosupport API" in the example below and in FIG. 1) configured to determine a geographic location of a target building in the urban environment. The custom second geocoding application 104 uses either a forward geocoding process wherein the geolocation is identified based on a street address, or a reverse geocoding process wherein the geolocation is based on the point location, i.e., the latitude and longitude location. The data for determining the geolocation is requested and received from at least one municipal database, the first data source 6, storing information for the local urban environment. Indices in the application cross-reference the street address location and point location (latitude-longitude location).

The custom second geocoding application 104 may also request and receive other municipal information including place name identification, building identification number information ("BIN"), tax lot identification information, borough, block and tax lot identification information ("BBL") and a street intersection information.

The invention is also a computer implemented method for performing geolocation within an urban environment to at least a building floor level by combining geocoded locations with data available from municipal agencies processed to calculate estimated elevation of building floors. The method comprises providing a first geocoding application 1 associated with a first computer processor in communication with a first data source 6 and a second data source 7. The first geocoding application is configured to request and receive a geographic location of a target building in the urban environment from the first data source 6, and dimensional building data in the form of a building dataset for the target building from the second data source 7. The building dataset includes at least the ground elevation of the target building, the number of floors in the target building and the height of the target building. The first geocoding application is configured to calculate from the building dataset the building floor level of a particular floor in the target building. The first geocoding application uses standard equations for estimating building height, but the standard equations have been adapted to generate an elevation of a particular floor within a target building relative to the ground elevation of the target building. The first geocoding application is further configured to combine the geographic location and the building floor level to calculate a building floor level geolocation in the target building.

The computer implemented method further comprises providing a user interface 2 associated with a second computer processor in communication with the first computer processor of the first geocoding application. The user interface 2 is configured to receive and display the building floor level geolocation in the target building on a map or 3D graphic representation.

Forward geocoding is the process of transforming an address (or place, etc.) to a location on the Earth's surface (i.e., a latitude and longitude location). The computer system and method of the present invention is preferably configured to perform forward geocoding using address information, place information, building identification number (BIN) information, tax lot information, borough, block and tax lot (BBL) information, or street intersection information in an urban environment, such as, for example, NYC. Examples of products that can be associated with the system and method of the present invention to accomplish forward geocoding processing to address, place name and intersection include, for example, forward geocoding products available from Esri, Google, Bing and Mapquest. Two additional technologies are available for geocoding in the NYC urban environment that will geocode to address, place, BIN and BBL. Those two technologies are NYC Geoclient API (available from the NYC Department of Information Technology and Telecommunications—"DoITT") and Geosupport Desktop Edition (available from the New York City Department of City Planning). The Geoclient API uses the Geosupport system to perform geocodes, so they may be considered the same technology. Although Geoclient uses the Geosupport system for geocoding, it is limited in that it currently does not geocode addresses to the building level, but rather only to the street centerline location. The present invention as claimed provides address location to the specific address point within the building, including locating the address as a 3D component of the building. If, for example, there is insufficient data available to locate the specific address point in the building, the system and method of the present invention will default to the street centerline location.

Geocoding to the 3D building floor location of the address within the building is accomplished in the system and method of the present invention by using municipal data available from various departments in the city. For example, in NYC, the Department of Information Technology & Telecommunications (DoITT) compiles data for each building within NYC including the ground elevation of the building, the number of above and below ground floors in the building and the building height. The present invention uses the data to estimate the height of a floor in a building. Algorithms used by the system and method for estimating floor height are based on the Council for Tall Buildings and Urban Habitat (http://www.ctbuh.org/) equations for estimating building height (see:
http://www.ctbuh.org/TallBuildings/HeightStatistics/HeightCalculator/tabid/1007/language/en-US/Default-.aspx—incorporated herein by reference). However, instead of estimating building height, the equations are adapted to estimate floor height of a particular floor.

The following examples illustrate how the 3D geolocation is calculated to building floor level wherein:
$height_L$=Lobby height
$height_F$=Floor height
$height_{BN}$=Height of building excluding lobby
$elevation_R$=Building roof elevation (above sea level)
$elevation_G$=Ground elevation (above sea level)
$elevation_F$=Floor elevation (above sea level)
$floor_B$=Number of floors in the building
floor=Number of floor to be estimated When a requested floor is above 2:

$$height_{BN} = \frac{elevation_R - height_L}{floor_B - 1}$$

$$elevation_F = elevation_G + height_L + ((floor-2)*height_{BN})$$

When a requested floor is above below 0 (below ground):

$$elevation_F = elevation_G - (floor*height_{BN})$$

Reverse geocoding functionality may also be incorporated in system and method of the present invention. Reverse geocoding is the process of translating a point location (a latitude and longitude location) to an address or place name. The present invention is configured to perform reverse geocoding to an address, as well as to all alternate names for the street segment. In system and method of the present invention, the reverse geocoding feature may be enhanced with an 'autocomplete' function, wherein a user's initial input of characters for an address will generate a list of completed addresses that begin with those characters. The system and method of the present invention uses Elasticsearch, and Python code for processing address data and building Elasticsearch indices to support the autocomplete function. Autocomplete products are available from Esri, Bing, Google and Mapquest for incorporation in the present system and method, but these products do not use local municipal location or dimensional data, so resulting outputs may be less desirable.

Batch geocoding functionality may also be incorporated in the system and method of the invention. Batch geocoding is the process of having multiple addresses geocoded in one "batch" job. Batch geocoding can be done in two ways: as an HTTP GET or POST directly against the REST endpoint, or using the ArcGIS Online batch geocoding functionality. Similar batch geocoding products are available from Esri, Bing, Google and Mapquest for incorporation in the present system and method, but these other products do not use local municipal location or dimensional data (e.g., location, place name, BIN BBL or intersection information), so resulting outputs may be less desirable.

The system and method of the present invention is preferably configured to be compliant with the Esri ArcGIS Server Geocoding REST API. Accordingly, the system and method for performing 3D geolocation of the present invention can be used within the Esri ArcGIS Online/Portal in the same manner as an Esri Geocoding Service. After adding the application of the present invention into the ArcGIS Online environment, the user interface of the present invention will be accessible from within all ArcGIS Online maps and apps, such as, for example, Collector, Web Appbuilder, etc.

As a more specific example of the present invention, the following is provided for the NYC urban environment. The components of the invention in the NYC environment include the first geocoding application 1 ("LocateNYC REST API"), the user interface 2, the second geocoding application 3 as a custom application ("LocateNYC Geosupport API"), the second geocoding application 4 as a third party application (e.g., "Geoclient REST API"), and a supporting third party application 5 (e.g., "Geosupport Desktop Edition"), the first data source 6 (e.g., "Elasticsearch"—for reverse geocoding and autocompletion of addresses), and the second data source 7 (e.g., "MongoDB"—for storage, logging, authentication and building floor geocoding data). Other applications that may be incorporated in the first geocoding application 1 of the present invention include software from the npm repository (https://www.npmjs.com/) available under open source licenses. The following packages may be used directly in the first geocoding application 1 of the present invention: "azure-storage": "^2.7.0"; "bcrypt-nodejs": "latest"; "body-parser": "^1.15.2"; "connect-flash": "~0.1.1"; "connect-mongo": "^1.3.2"; "cookie-parser": "^1.4.3"; "csurf": "^1.9.0"; "ejs": "~0.8.5"; "elasticsearch": "^13.3.1"; "express": "^4.12.3"; "express-session": "^1.14.1"; "express-validator": "^3.2.0"; "helmet": "^3.8.1"; "jsonwebtoken": "^7.3.0"; "lodash": "^4.17.4"; "method-override": "2.3.6"; "mongoose": "^4.6.2"; "morgan": "~1.0.0"; "multiparty": "^4.1.3"; "nodemailer": "^4.0.1"; "passport": "*"; "passport-arcgis": "^0.1.8"; "passport-jwt": "^2.2.1"; "passport-local": "~0.1.6"; "proj4": "^2.4.3"; "request": "^2.81.0"; "rotating-file-stream": "^1.2.1"; "serve-favicon": "^2.4.3"; "swagger-express-mw": "^0.1.0"; "unzip": "^0.1.11"; "winston": "^2.3.1"; "JSONStream": "^1.3.1"; "csv-parse": "^1.2.0"; "fs": "0.0.1-security"; "should": "^7.1.0"; "supertest": "^1.0.0".

The system and method as described and claimed herein has the advantages of providing accurate floor level geolocation within and urban environment, such as, for example, NYC. However, the scope of the invention should not be limited by the examples above.

What is claimed is:

1. A computer system for performing geolocation within an urban environment to at least a building floor level by combining geocoded locations with dimensional data available from municipal agencies processed to calculate estimated elevation of building floors, the system comprising:
    a first geocoding application associated with a first computer processor in communication with a first data source and a second data source, the first geocoding application configured to request and receive a geographic location of a target building in the urban environment from the first data source and a building dataset for the target building from the second data source, the building dataset including at least the ground elevation of the target building, the number of floors in the target building and the height of the target building, the first geocoding application configured to calculate from the building dataset the building floor level of a particular floor in the target building using standard equations for estimating building height, the standard equations adapted to generate the elevation of the particular floor within the target building relative to the ground elevation of the target building, the first geocoding application further configured to combine the geographic location and the building floor level to calculate a building floor level geolocation in the target building;
    a user interface associated with a second computer processor in communication with the first computer processor of the first geocoding application, the user interface configured to receive and display the building floor level geolocation in the target building on a map or 3D graphic representation of the urban environment.

2. The computer system of claim 1 wherein the first data source is a third party second geocoding application in communication with a geolocation database.

3. The computer system of claim 1 wherein the first data source is a second geocoding application configured to determine a geographic location of a target building in the urban environment, the geographic location determined by at least one of a forward geocoding process and a reverse geocoding process, with data requested and received from at least one municipal database storing information for the urban environment.

4. The computer system of claim 3 wherein the municipal database includes municipal information indexed to at least one of a street address and a geographic point location.

5. The computer system of claim 4 wherein the indexed municipal information includes at least one of a place name identification, a building identification number, a tax lot identification, a borough, block and tax lot identification and a street intersection.

6. A computer implemented method for performing geolocation within an urban environment to at least a building floor level by combining forward geocoding locations with dimensional data available from municipal agencies processed to calculate estimated elevation of building floors, the method comprising:

providing a first geocoding application associated with a first computer processor in communication with a first data source and a second data source, the first geocoding application configured to request and receive a geographic location of a target building in the urban environment from the first data source and a building dataset for the target building from the second data source, the building dataset including at least the ground elevation of the target building, the number of floors in the target building and the height of the target building, the first geocoding application configured to calculate from the building dataset the building floor level of a particular floor in the target building [using standard equations for estimating building height, the standard equations adapted to generate the elevation of the particular floor within the target building] relative to the ground elevation of the target building, the first geocoding application further configured to combine the geographic location and the building floor level to calculate a building floor level geolocation in the target building; and providing a user interface associated with a second computer processor in communication with the first computer processor of the first geocoding application, the user interface configured to receive and display the building floor level geolocation in the target building.

7. The computer implemented method of claim 6 further comprising providing as the first data source a commercially available second geocoding application in communication with a geolocation database.

8. The computer implemented method of claim 6 further comprising providing as the first data source a second geocoding application configured to determine a geographic location of a target building in the urban environment, the geographic location determined by at least one of a forward geocoding process and a reverse geocoding process, with data requested and received from at least one municipal database storing information for the urban environment.

9. The computer implemented method of claim 8 wherein the municipal database includes municipal information indexed to at least one of a street address and a geographic point location.

10. The computer implemented method of claim 9 further comprising providing as the indexed municipal information at least one of a place name identification, a building identification number, a tax lot identification, a borough, block and tax lot identification and a street intersection.

* * * * *